US010293418B2

(12) United States Patent
Chiang et al.

(10) Patent No.: US 10,293,418 B2
(45) Date of Patent: May 21, 2019

(54) MODULAR CIRCULAR SAW

(71) Applicant: REXON INDUSTRIAL CORP., LTD., Taichung (TW)

(72) Inventors: Hung Jung Chiang, Taichung (TW); Thing-Tai Chou, Taichung (TW)

(73) Assignee: REXON INDUSTRIAL CORP., LTD., Taichung (TW)

( * ) Notice: Subject to any disclaimer, the term of this patent is extended or adjusted under 35 U.S.C. 154(b) by 0 days.

(21) Appl. No.: 15/817,390

(22) Filed: Nov. 20, 2017

(65) Prior Publication Data

US 2018/0141140 A1 May 24, 2018

(30) Foreign Application Priority Data

Nov. 24, 2016 (TW) .................................. 105138598

(51) Int. Cl.
*B23D 47/02* (2006.01)
*B23D 45/04* (2006.01)
*B23D 47/04* (2006.01)

(52) U.S. Cl.
CPC ........... *B23D 47/02* (2013.01); *B23D 45/042* (2013.01); *B23D 47/04* (2013.01)

(58) Field of Classification Search
CPC ...... B23D 45/042; B23D 47/02; B23D 47/04; E04B 1/34321; E04B 1/34352; E04B 1/3483; E04B 1/4157; E04B 1/98; E04B 2001/3583; E04C 3/34; E04H 5/02; E04H 9/021; F16F 15/04
See application file for complete search history.

(56) References Cited

U.S. PATENT DOCUMENTS

| | | | | |
|---|---|---|---|---|
| 4,650,224 A | * | 3/1987 | Smith | E03F 1/008 137/899 |
| 5,004,029 A | * | 4/1991 | Garner | B23D 47/025 108/101 |
| D357,140 S | * | 4/1995 | Hollinger | D6/684 |
| 5,564,323 A | | 10/1996 | Sasaki et al. | |
| 5,953,766 A | * | 9/1999 | Szoke | E03D 9/08 4/420.4 |
| D535,491 S | * | 1/2007 | Wise | D6/684 |
| 8,539,870 B2 | * | 9/2013 | Behr | B27B 5/206 83/471.3 |

(Continued)

*Primary Examiner* — Stephen Choi
(74) *Attorney, Agent, or Firm* — Bacon & Thomas, PLLC

(57) ABSTRACT

A modular circular saw includes a base, a worktable disposed on the base and a workpiece supporting unit. The workpiece supporting unit has two supporting frames respectively and correspondingly located on two lateral sides of the worktable; each workpiece supporting unit has a supporting shaft and two corresponding extending shafts. Each extending shaft has one end pivotally connected to the base, another end of the extending shaft is pivotally connected to one end of the supporting shaft, correspondingly. When the workpiece supporting unit is in an extended position for receiving a workpiece, the two supporting shafts are substantially co-planar with the worktable, such that the two supporting shafts provides extra support to a workpiece of large size. When the workpiece supporting unit is in a folded position, the two supporting shafts are located above the worktable for minimizing the size of the saw and for allowing the user to grip the saw for easy transportation.

9 Claims, 6 Drawing Sheets

(56) References Cited

U.S. PATENT DOCUMENTS

2005/0262985 A1    12/2005  Talesky
2012/0186412 A1*   7/2012  Wynne ................. B23D 45/044
                                                            83/468.2
2013/0160629 A1     6/2013  Feldner et al.

\* cited by examiner

MODULAR CIRCULAR SAW

BACKGROUND OF THE INVENTION

1. Field of the Invention

The present invention relates to table saw technology and more particularly, to a folding collapsible modular circular saw. Priority is claimed to Taiwan application Number 105138598, filed on Nov. 24, 2016, the entire disclosure of which is herein incorporated by reference.

2. Description of the Related Art

Before operating a circular saw to cut a workpiece, it is the normal way to put the workpiece on the worktable of the table of the circular saw and to abut the workpiece against the rip fence, avoiding displacement of the workpiece during cutting. To fit different size workpieces, a circular saw is often equipped with an additional support structure to assist the worktable, giving support to the workpiece for cutting. Similar designs are disclosed in U.S. Pat. No. 5,564,323, US2013/0160629 and US2005/0262985. The use of such additional support structure avoids displacement of the workpiece to affect cutting stability and precision during the cutting operation. However, the support structures disclosed in the aforementioned patent document are not satisfactory in stability and supportability, and are not folding collapsible to effectively reduce the dimension of the saw when not in use, and thus they are inconvenient for storage and carrying of the saw by the user.

SUMMARY OF THE INVENTION

The present invention has been accomplished with these circumstances in view. It is the main object of the present invention to provide a modular circular saw, which is collapsible by folding to effectively reduce the volume of the saw for convenient storage and delivery when not in use and, which provides an extended supporting area to support the workpiece when the saw is extended out, enhancing cutting stability.

To achieve this and other objects of the present invention, a modular circular saw comprises a base, a worktable, a cutting unit and a workpiece support unit is provided. The worktable is rotatably supported on the base, defining a work surface. The cutting unit is pivotally mounted at the worktable and movable up and down relative to the worktable. The workpiece support unit comprises two support frames disposed at two opposite sides of the worktable, each comprising a support rod and two extension rods. The two extension rods have respective ends thereof, respectively pivotally connected to the base, and respective opposite ends thereof respectively pivotally connected to each end of the support rod. Thus, the workpiece support unit is movable relative to the worktable between an extended position to support cutting the workpiece and a folded position for storage and carrying the circular saw.

Thus, when the workpiece support unit is in the extended position, the top of support rods of the two support frames are disposed in a coplanar relationship with the work surface of the worktable, meanwhile the two support frames facilitate the worktable to support large size of workpieces. Alternatively, when the workpiece support unit is in the folded position, the support rods of the two support frames are disposed above the worktable and kept apart from the work surface of the worktable at a predetermined distance. Accordingly, in the folded position the circular saw configuration is not only minimized in dimensions for easy storage, but also allows the user to grip the support rods of the two support frames to transport the folded modular circular saw.

Preferably, the support rod of one support frame of the workpiece support unit comprises a through hole; the support rod of the other support frame of the workpiece support unit is mounted with a positioning rod. The positioning rod has a screw hole located in one end thereof. The workpiece support unit further comprises a knob screw. The knob screw comprises a threaded shank inserted through the through hole. Thus, when the workpiece support unit is in the folded position, the threaded shank of the knob screw is threaded into the screw hole of the positioning rod to lock the support rods of the two support frames to the positioning rod, enhancing the structural stability of the workpiece support unit in the folded position.

Preferably, each support frame further comprises a locating rib rod and two opposed substantially parallel extension rods. The locating rib rod in each supporting frame has two opposing ends thereof respectively connected to each respective substantially parallel extension rods of each supporting frame. The workpiece support unit further comprises two opposing wing plates and two opposing workpiece stopper plates. The wing plates have respective one ends thereof respectively pivotally connected to the respective locating rib rods of the support frames. The workpiece stopper plates have respective one ends thereof respectively pivotally connected to the respective wing plates. Further, each wing plate comprises a first supporting plane. Further, each workpiece stopper plate comprises a second supporting plane. Thus, when the workpiece support unit is in the extended position, the first supporting planes of the wing plates and the work surface of the worktable exhibit a coplanar relationship and the second supporting planes of the workpiece stopper planes are disposed perpendicular to the work surface of said worktable so that the wing plates and the workpiece stopper plates can assist the worktable to provide support and positioning effects toward the workpiece. In the alternative, when the workpiece support unit is in the folded position, the first supporting planes of the wing plates and the second supporting planes of the workpiece stopper planes are respectively disposed perpendicular to the work surface of the worktable and the first supporting planes of the wing plates are respectively abutted against the respective second supporting planes of the workpiece stopper planes, avoiding interference between the two support frames.

Preferably, the base further comprises two bearing blocks respectively located at the periphery thereof at two opposite sides. Each bearing block comprises a positioning hole. Further, each workpiece stopper plate comprises a positioning member disposed opposite to one respective wing plate. When the workpiece support unit is in the extended position, the wing plates have respective bottom surfaces thereof abutted against the respective bearing blocks of the base and the positioning members of the workpiece stopper plates are respectively plugged into the respective positioning holes of the base to achieve the positioning of the respective workpiece stopper plates.

Preferably, the workpiece support unit further comprises two opposing foot pad mounts respectively rotatably mounted onto the support rods of the two support frames of the workpiece support unit, and two opposing adjustable foot pads respectively adjustably fastened to the foot pad mounts by a screw joint. Thus, the two adjustable foot pads can be rotated to micro-adjust the elevation of the support rods of the two support frames, while enhancing the structural stability of the workpiece support unit in the extended position.

Preferably, the extension rods of the two support frames axially extend perpendicular to the work surface of the worktable when the workpiece support unit is in the folded position so that the two support frames constitute a protective frame for the circular saw and to reduce the dimensions thereof for storage and carrying.

Preferably, the ends of the extension rods of the two support frames are pivotally coupled to the respective support rods by a respective L-shaped coupling tube, and respective opposite ends thereof respectively pivotally connected to one end of a front locating rod and one end of a rear locating rod by a respective L-shaped coupling tube wherein the front locating rod and the rear locating rod are respectively mounted at opposing front and rear ends of a bottom surface of the base in a parallel manner. Thus, in addition to the function of pivot connection, these L-shaped coupling tubes also provide an anti-collision function.

Other and further advantages and features of the present invention will be understood by reference to the following specification in conjunction with the accompanying drawings.

DETAILED DESCRIPTION OF THE INVENTION

The technical contents and features of the present invention will now be described hereinafter with reference to the accompanying drawings. In the specification, the directional terms "front", "rear", "up", "down", "top", "bottom" and the like, which are mentioned in this specification, are merely descriptive terms based on the normal use for directional indication but not intended for use to limit the scope of the invention.

Figure 1:
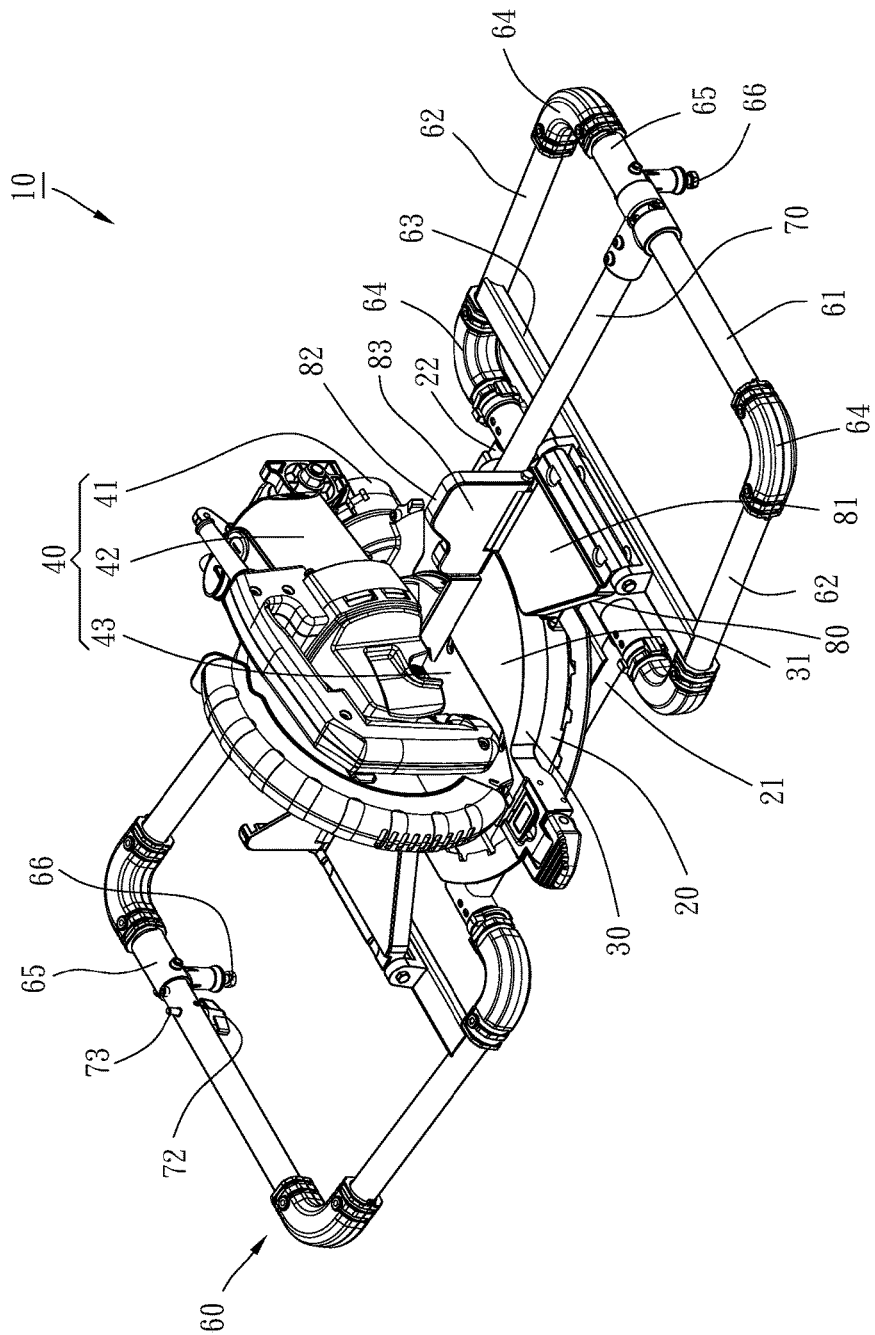
FIG. 1 is an oblique top elevational view, illustrating a workpiece support unit of a modular circular saw in an extended position in accordance with the present invention.
Figure 2:
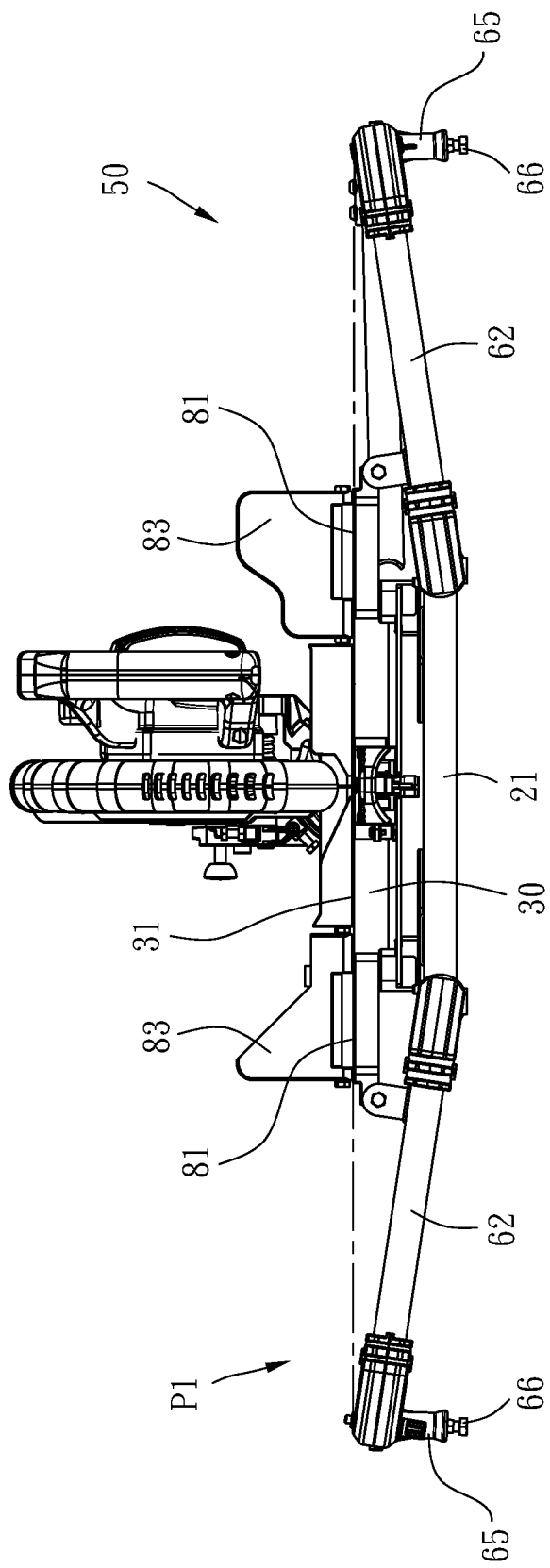
FIG. 2 is a front view of the modular circular saw shown in FIG. 1.
Figure 3:
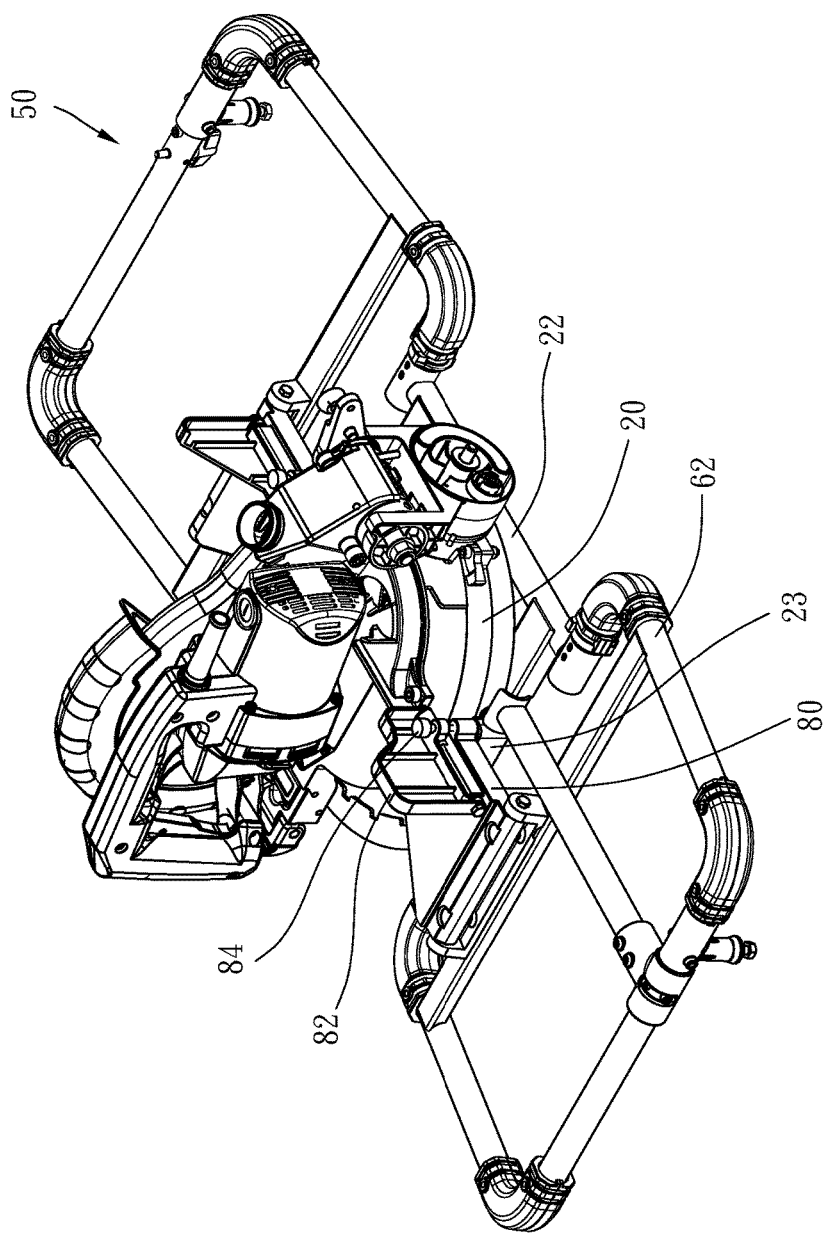
FIG. 3 corresponds to FIG. 1 when viewed from another angle.

Referring to FIGS. 1 and 2, a modular circular saw 10 in accordance with the present invention is illustrated and which comprises a base 20, a worktable 30, a cutting unit 40, and a workpiece support unit 50.

Figure 4:
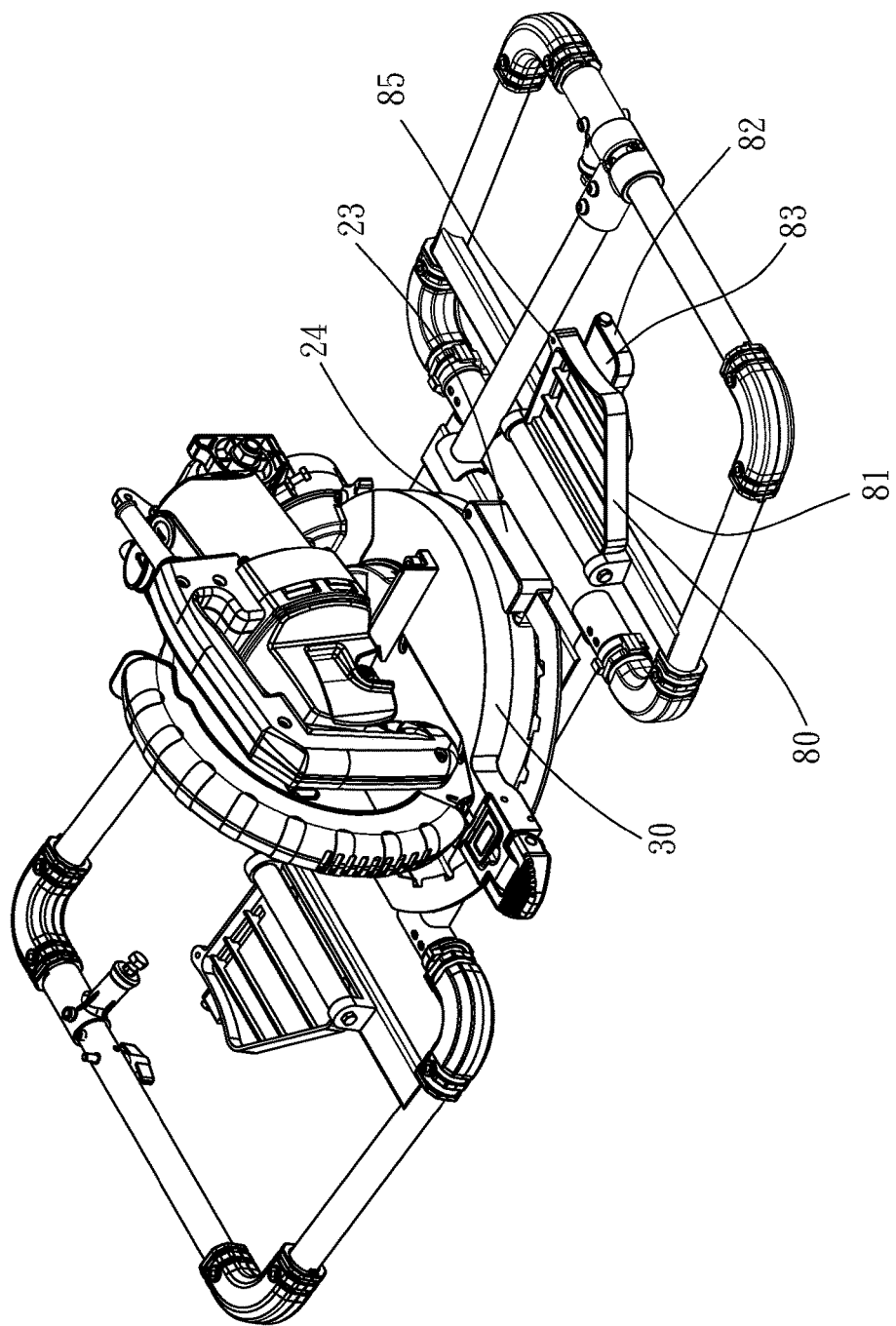
FIG. 4 is another elevational view of the modular circular saw, illustrating the status of the wing plates and the workpiece stopper plates in the folded position.

The base 20 comprises a front locating rod 21 and a rear locating rod 22 respectively located at opposing front and rear ends of a bottom surface thereof and disposed in parallel, two bearing blocks 23 respectively located at the periphery thereof at two opposite sides, and a positioning hole 24 located in each bearing block 23, see FIG. 4.

The worktable 30 is rotatably supported on the base 20, defining a work surface 31 for supporting a workpiece (not shown).

The cutting unit 40 comprises a saw arm 41, a power drive 42 and a saw blade 43. The saw arm 41 has one end thereof pivotally connected to a rear side of the worktable 30. The power drive 42 is mounted at the saw arm 41 for providing a driving force to the saw. The saw blade 43 is mounted at the saw arm 41 and connected to the power drive 42 so that the saw blade 43 is rotatable by the power drive 42 and movable up and down with the saw arm 41 relative to the worktable 30.

The workpiece support unit 50 comprises two support frames 60. Each support frame 60 comprises a support rod 61, two opposing and substantially parallel extension rods 62 and a locating rib rod 63. The extension rods 62 of each supporting frame 60 have one end thereof respectively pivotally connected to one end of the front locating rod 21 and one end of the rear locating rod 22 of the base 20 by a L-shaped coupling tube 64, and respective opposite ends thereof respectively pivotally connected to two opposite ends of the support rod 61 by a respective L-shaped coupling tube 64. The locating rib rod 63 is connected between the two opposing extension rods 62 of the support frame 60. The L-shaped coupling tubes 64 are mainly configured for the functions of pivot connection and anti-collision.

Thus, the workpiece support unit 50 is movable relative to the worktable 30 between an extended position P1 and a folded position P2. When the workpiece support unit 50 is in the extended position P1, as illustrated in FIGS. 1 and 2, the support rods 61 of the two support frames 60 and the work surface 31 of the worktable 30 are disposed in a coplanar relationship so that the support rods 61 of the two support frames 60 of the workpiece support unit 50 assist the worktable 30 to support a large size workpiece.

To enhance the structural stability of the workpiece support unit 50 in the extended position P1, the workpiece support unit 50 further comprises two rotary foot pad mounts 65 respectively and rotatably mounted onto the support rods 61 of the two support frames 60, and an adjustable foot pad 66 adjustably fastened to each rotary foot pad mount 65 by a screw joint. In addition to enhancing the structural stability, the adjustable foot pads 66 can be rotated relative to the respective rotary foot pad mounts 65 to micro-adjust the elevation of the support rods 61 of the two support frames 60, ensuring accurate coplanar relationship between the support rods 61 of the two support frames 60 and the work surface 31 of the worktable 30.

Figure 5:
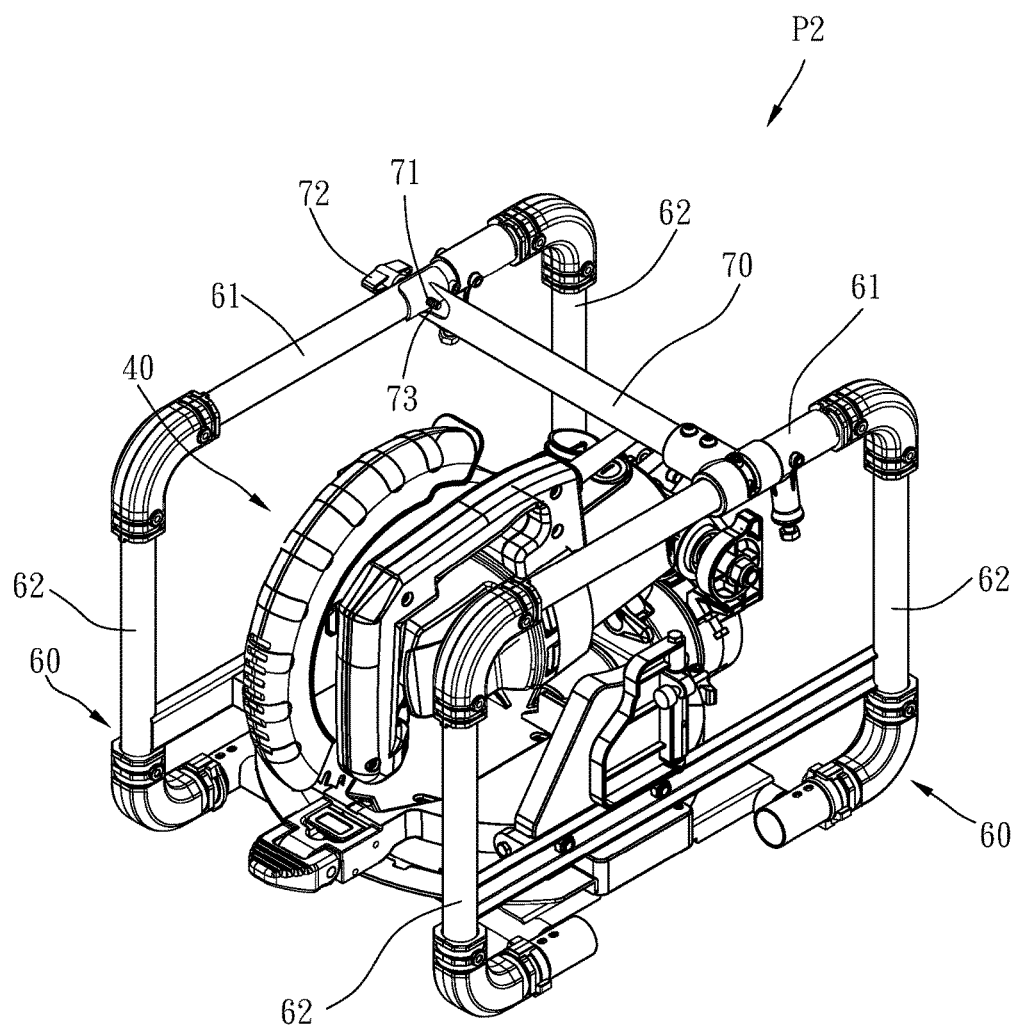
FIG. 5 is an oblique top elevational of the modular circular saw, illustrating the workpiece support unit in the folded position.

When the workpiece support unit 50 is in the folded position P2 shown in FIG. 5, the support rods 61 of the two support frames 60 are disposed above the worktable 30 and kept apart from the work surface 31 of the worktable 30 by a predetermined distance, and the extension rods 62 of the two support frames 60 axially extend perpendicular to the work surface 31 of the worktable 30, and thus, the support frames 60 works as a support frame means to protect the cutting unit 40 while the volume of the modular circular saw 10 is greatly reduced.

To enhance the structural stability of the workpiece support unit 50 in the received position P2, the workpiece support unit 50 further comprises a positioning rod 70 and a knob screw 72. The positioning rod 70 has one end thereof rotatably coupled to the support rod 61 of one support frame 60, and an opposite end thereof providing a screw hole 71. The knob screw 72 comprises a threaded shank 73 rotatably mounted in a protruding over the support rod 61 of the other support frame 60. Thus, when the workpiece support unit 50 is in the received position P2, the threaded shank 73 of the knob screw 72 can be threaded into the screw hole 71 of the positioning rod 70 to lock the positioning rod 70 to the support rod 61 of the other support frame 60.

In the alternative, the workpiece support unit 50 further comprises two opposing wing plates 80, two opposing workpiece stopper plates 82 and two opposing positioning members 84. The wing plates 80 are respectively pivotally connected to the locating rib rods 63 of the two support frames 60, each comprising a first supporting plane 81 and a through hole 85 at a rear end thereof. The workpiece stopper plates 82 are respectively pivotally connected to the wing plates 80, each comprising a second supporting plane 83. The positioning members 84 are respectively mounted at the workpiece stopper plates 82 opposite to the respective wing plates 80 for plugging into the respective through holes 85 of the respective wing plates 80 and the respective positioning holes 24 of the base 20.

When rotated and extended out the support frames 60, the wing plates 80 and the workpiece stopper plates 82 are also extended out. When the wing plates 80 are extended out, they are respectively abutted against the respective bearing blocks 23 of the base 20, keeping the first supporting planes 81 of the wing plates 80 and the work surface 31 of the worktable 30 in a coplanar relationship. At this time, the wing plates 80 assist the worktable 30 and the support frames 60 to give support to the workpiece (not shown), and the workpiece stopper plates 82 are respectively fastened to the respective positioning holes 24 of the base 20 through the respective positioning members 84, keeping the respective second supporting planes 83 perpendicular to the work surface 31 of the worktable 30, thus, the workpiece stopper plates 82 provide a positioning effect to the workpiece, maintaining cutting stability.

Further, to prevent interference between the wing plates 80 and workpiece stopper plates 82 and the support frames 60, the wing plates 80 and the workpiece stopper plates 82 must be collapsed before folding up the two support frames 60. At this time, the connection between the positioning members 84 and the through holes 85 of the wing plates 80 and positioning holes 24 of the base 20, is released and then bias the workpiece stopper plates 82 toward the wing plates 80 to abut the second supporting planes 83 of the workpiece stopper plates 82 against the respective first supporting planes 81 of the respective wing plates 80, and then bias the wing plates 80 in direction away from the worktable 30, as illustrated in FIG. 4, thereafter, fold up the support frames 60.

Figure 6:
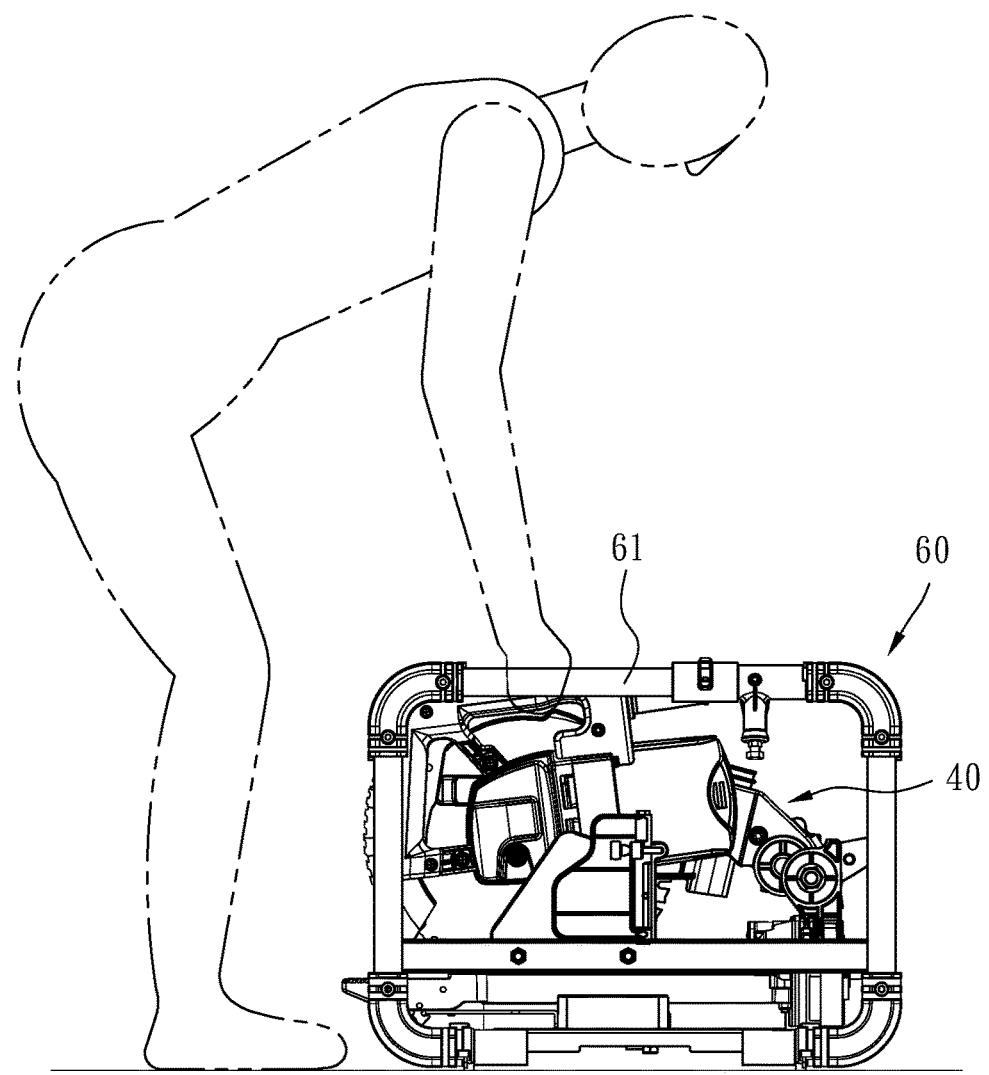
FIG. 6 is a schematic drawing illustrating carrying of the modular circular saw in the folded position.

In conclusion, when the two support frames 60 of the modular circular saw 10 are extended out, the workpiece supporting surface area of the modular circular saw 10 is greatly increased; when the two support frames 60 of the modular circular saw 10 are folded up, the volume of the modular circular saw 10 is greatly reduced for convenient storage, and the received support frames 60 give protection to the cutting unit 40. Further, the user can hold the support rods 61 of the two support frames 60 to carry the modular circular saw 10 conveniently by hand when the two support frames 60 are folded up, as illustrated in FIG. 6, facilitating carrying.

What is claimed is:
1. A modular circular saw, comprising:
a base;
a worktable rotatably supported on the base, the worktable defining a work surface;
a cutting unit pivotally mounted at the worktable and movable up and down relative to the worktable; and
a workpiece support unit comprising two support frames disposed at two opposite sides of the worktable, each support frame comprising a support rod having two ends and two opposing extension rods attached to each end of the support rod, the two extension rods each having respective ends thereof respectively pivotally connected to the base and respective opposite ends thereof pivotally connected to the two opposite ends of the support rod so that the workpiece support unit is movable relative to the worktable between an extended position where the support rods of the two support frames are disposed in a coplanar relationship with the work surface of the worktable and a folded position where the support rods of the two support frames are disposed above the worktable and kept apart from the work surface of the worktable at a predetermined distance.

2. The modular circular saw as claimed in claim 1, wherein the workpiece support unit further comprises a positioning rod and a knob screw, the positioning rod having one end thereof rotatably coupled to the support rod of one of the support frames and an opposite end thereof having a screw hole, the knob screw comprising a threaded shank rotatably inserted through the support rod of the second support frame so that when the workpiece support unit is in the folded position, the threaded shank of the knob screw is fastenable to the screw hole of the positioning rod to lock the support rods of the two support frames together.

3. The modular circular saw as claimed in claim 1, wherein each support frame further comprises a locating rib rod, the locating rib rod having two opposing ends thereof respectively connected to one of the extension rods forming the support frame; the workpiece support unit further comprises two opposing wing plates and two opposing workpiece stopper plates, the wing plates having respective ends thereof respectively pivotally connected to the respective locating rib rods of the support frames, the workpiece stopper plates having respective ends thereof respectively pivotally connected to the respective wing plates, each wing plate comprising a first supporting plane, each workpiece stopper plate comprising a second supporting plane, the first supporting planes of the wing plates and the work surface of the worktable exhibiting a coplanar relationship and the second supporting planes of the workpiece stopper planes being disposed perpendicular to the work surface of the worktable when the workpiece support unit is in the extended position, the first supporting planes of the wing plates and the second supporting planes of the workpiece stopper planes being respectively disposed perpendicular to the work surface of the worktable and the first supporting planes of the wing plates being respectively abutted against the respective second supporting planes of the workpiece stopper planes when the workpiece support unit is in the received position.

4. The modular circular saw as claimed in claim 3, wherein the base further comprises two bearing blocks respectively located at the periphery thereof, at two opposite sides thereof, each bearing block comprising a positioning hole; each wing plate comprises a through hole; each workpiece stopper plate comprises a positioning member disposed opposite to the respective wing plate; the wing plates have respective bottom surfaces thereof abutted against the respective bearing blocks of the base and the positioning members of the workpiece stopper plates are respectively plugged into the respective through holes of the wing plates and the respective positioning holes of the base when the workpiece support unit is in the extended position.

5. The modular circular saw as claimed in claim 1, wherein when the workpiece support unit is in the folded position, the extension rods of the two support frames axially extend perpendicular to the work surface of the worktable.

6. The modular circular saw as claimed in claim 1, wherein the workpiece support unit further comprises two opposing foot pad mounts respectively rotatably mounted onto the support rods of the two support frames of the workpiece support unit, and two opposing adjustable foot pads respectively adjustably fastened to the foot pad mounts by a screw joint.

7. The modular circular saw as claimed in claim 1, wherein the extension rods of the two support frames are respectively pivotally coupled to the respective the support rods by a respective L-shaped coupling tube.

8. The modular circular saw as claimed in claim 1, wherein the base further comprises a front locating rod and a rear locating rod respectively located at opposing front and rear ends of a bottom surface thereof; the extension rods of the two support frames are respectively pivotally connected to one end of the front locating rod and one end of the rear locating rod.

9. The modular circular saw as claimed in claim 8, wherein the extension rods of the two support frames are respectively pivotally connected to one end of the front locating rod and one end of the rear locating rod by a respective L-shaped coupling tube.

* * * * *